(12) United States Patent
Nesheim

(10) Patent No.: US 11,377,918 B2
(45) Date of Patent: Jul. 5, 2022

(54) DETERMINATION OF RHEOLOGY OF FLUID IN AN OIL OR GAS WELL

(71) Applicant: CONOCOPHILLIPS COMPANY, Houston, TX (US)

(72) Inventor: Gunvald Nesheim, Tananger (NO)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 16/919,277

(22) Filed: Jul. 2, 2020

(65) Prior Publication Data
US 2021/0002970 A1 Jan. 7, 2021

Related U.S. Application Data

(60) Provisional application No. 62/870,290, filed on Jul. 3, 2019.

(51) Int. Cl.
*E21B 21/08* (2006.01)
*E21B 49/08* (2006.01)

(52) U.S. Cl.
CPC .............. *E21B 21/08* (2013.01); *E21B 49/08* (2013.01)

(58) Field of Classification Search
CPC .................................. E21B 49/08; E21B 21/08
See application file for complete search history.

(56) References Cited

U.S. PATENT DOCUMENTS

| 2,203,595 | A | * | 6/1940 | Hall | ...................... E21B 49/088 166/116 |
| 4,627,271 | A | | 12/1986 | Abbott et al. | |
| 5,637,790 | A | | 6/1997 | de Corral | |
| 6,386,016 | B1 | | 5/2002 | Gleissle | |
| 2017/0204691 | A1 | * | 7/2017 | Xue | ........................ E21B 49/08 |

FOREIGN PATENT DOCUMENTS

WO 20150191091 A1 12/2015

OTHER PUBLICATIONS

Schafer, et al.—"An Evaluation of Flowmeters for the Detection of Kicks and Lost Circulation During Drilling", 1992, Society of Petroleum Engineers, IADC/SPE 23935; 10 pgs.
International Search Report for PCT/US2020/040652 dated Oct. 6, 2020, 3 pgs.
Vajargah, Ali Karimi, et al—"Determination of drilling fluid rheology under downhole conditions by using real-time distributed pressure data", 2015, Journal of Natural Gas Science and Engineering vol. 24, pp. 400-411; 12 pgs.

* cited by examiner

*Primary Examiner* — Dany E Akakpo
(74) *Attorney, Agent, or Firm* — ConocoPhillips Company

(57) ABSTRACT

The invention relates to the measurement of the rheology of drilling fluid down a hydrocarbon well in real time during operations. A sensor device comprising a pipe rheometer with multiple diameters is installed in a bottom hole assembly tool, such that a portion of the total flow of drilling fluid passes through it. In this way the rheological properties of the drilling fluid can be determined under the high pressures and elevated temperatures encountered downhole.

8 Claims, 4 Drawing Sheets

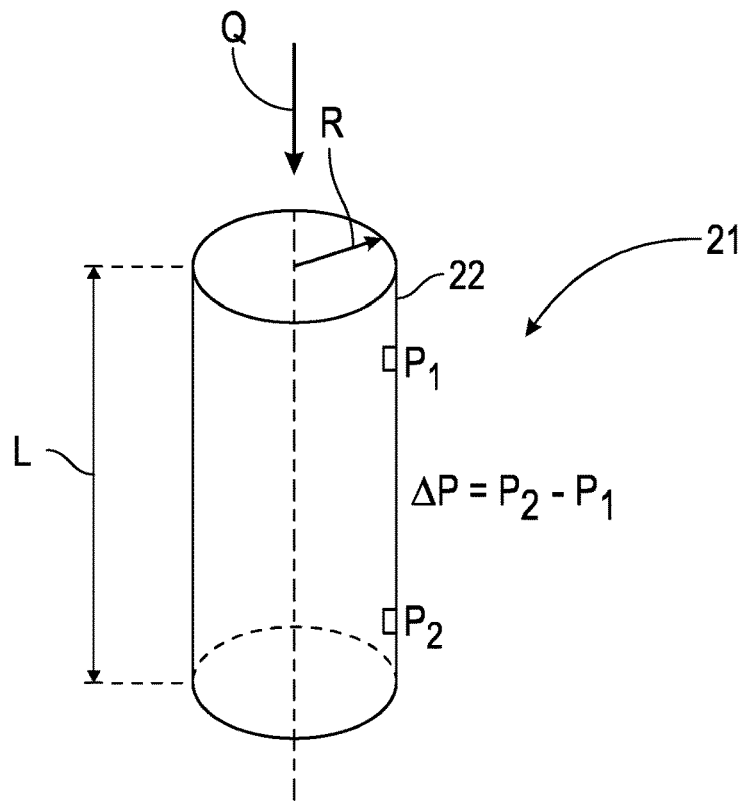
FIG. 2
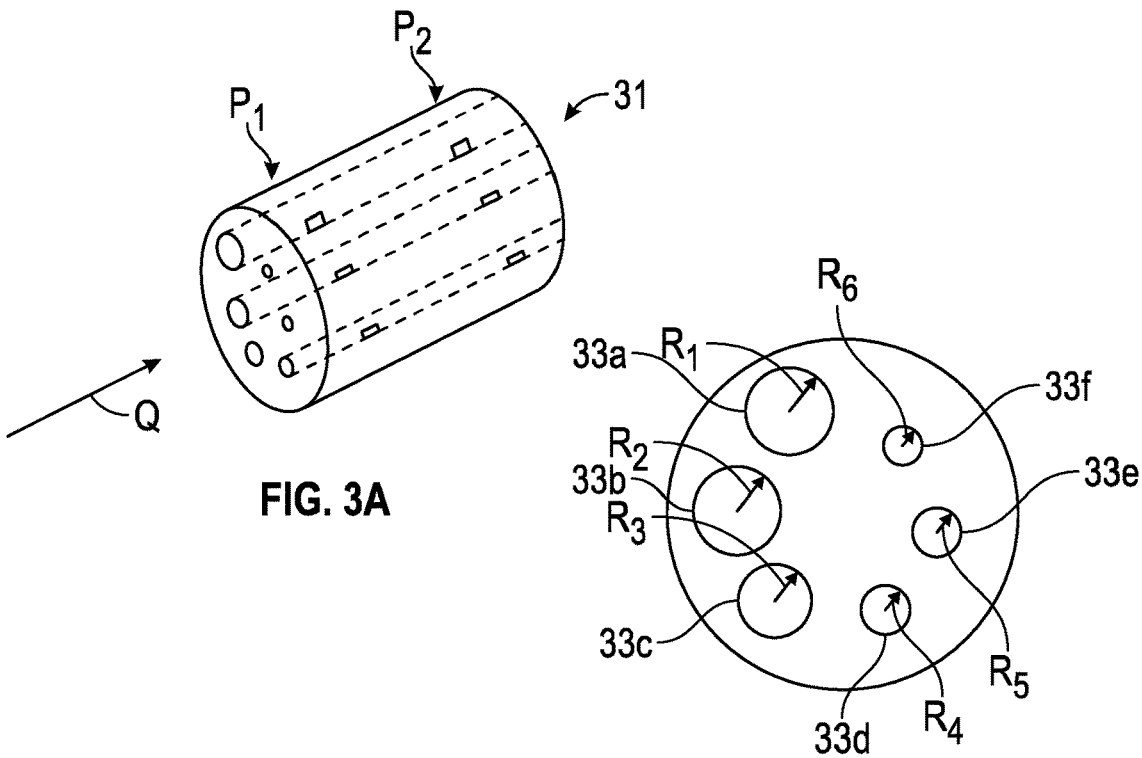
FIG. 3A
FIG. 3B

DETERMINATION OF RHEOLOGY OF FLUID IN AN OIL OR GAS WELL

CROSS-REFERENCE TO RELATED APPLICATIONS

This application is a non-provisional application which claims benefit under 35 USC § 119(e) to U.S. Provisional Application Ser. No. 62/870,290 filed Jul. 3, 2019, entitled "DETERMINATION OF RHEOLOGY OF FLUID IN AN OIL OR GAS WELL," which is incorporated herein in its entirety.

STATEMENT REGARDING FEDERALLY SPONSORED RESEARCH OR DEVELOPMENT

None.

FIELD OF THE INVENTION

This invention relates to the measurement and analysis of the properties of certain fluids in an oil or gas well.

BACKGROUND OF THE INVENTION

When drilling an oil or gas (hydrocarbon) well or performing some other operations downhole in a hydrocarbon well, it is desirable to understand the properties of any fluids in the well. Such fluids can include Synthetic and Oil-based drilling mud, or mixtures of these. These fluids are non-Newtonian and their properties can be hard to predict under downhole conditions of high pressure and elevated temperature.

For example, when a well is drilled, the rheology of the drilling mud needs to be known to determine how efficiently the hole will be cleaned of drilling cuttings. When planning a drilling operation, the design specification of the drilling mud (including rheology) is normally based on experience of what will effectively clean a hole of a certain type, but this method is imprecise and prone to error. The specification of the mud may be measured relatively easily and quickly at surface conditions, i.e. in a mud lab at atmospheric pressure and at a few selected temperatures, e.g. 20, 50 & 80 degrees Celsius. However, this does not give a good indication of the rheology of the mud under downhole conditions.

In the well the mud typically may be at up to 8 000 Psi (55.2 MPa) pressure and 130° C., which can significantly change the profile of the rheology of the mud at that point. These values are normal for a well in the Ekofisk field in the Norwegian North Sea but values elsewhere in the world can be considerably higher. A mud which appears to have the correct properties when analyzed at the surface might behave very differently downhole, and this can result in an incorrect specification of mud being selected. Not knowing the rheology under drilling conditions can lead to several issues, e.g. having the tripping speed too fast or too slow, poor cleaning of the well, sagging etc.

It is possible to have mud analyzed at downhole conditions at a specialist laboratory with equipment such as a Fann 75 (Model 75 Viscometer, available from Fann Instrument Company) or Grace 7500 (M7500 Ultra HPHT Rheometer, available from Grace Instrument Company). These pieces of equipment employ a rotating drum which has an inner drum or bobbin concentrically arranged within it. A fluid to be tested is introduced in the small annular space between the drums and the outer drum rotated at a variety of speeds. The inner drum is free to rotate and experiences a turning moment imparted via the test fluid. The turning moment is measured, e.g. using a sensitive coil spring, and the viscosity of the fluid under certain conditions can thereby be calculated.

However, the time needed for heating and pressurizing a sample, precision nature of these pieces of equipment means they would not normally be available at a wellhead, and therefore samples need to be sent to a laboratory. This process can take several days when the time to transport the sample to and from the specialist lab is included; the test itself may take 6-7 hours. That is often too long a delay for the results to be taken into account in real time operations, and the data can only be used for background work.

There is therefore a need to provide improved rheology measurement for downhole operations such as drilling.

The article entitled "Determination of drilling fluid rheology under downhole conditions by using real-time distributed pressure data", Vajargah et al., *Journal of natural Gas Science and Engineering*, describes the possibility of sensing rheology downhole by placing sensors at intervals along a drill string. However, there are potential issues with this approach, as discussed in more detail below. What is needed is an efficient and economical way to determine drilling fluid rheology under reservoir conditions in real time while drilling.

BRIEF SUMMARY OF THE DISCLOSURE

The inventor(s) have appreciated that, if real-time data about rheology at downhole conditions were available, it could allow for "real time" fine tuning of the fluid and increase confidence in the progress of a downhole operation such as drilling. It could decrease risks in the drilling process as operators would have a much better grasp on the hole cleaning and on likelihood of sag, both static sag and dynamic sag (sag is when the weighting material in the drilling fluid drops out). The data could be used as input to real time simulation programs that create schedules (tripping schedules) for how fast the pipe can be pulled out of hole without drawing in fluids/gas from the formation (swab effect). Currently, old data tends to be used, and this can lead to a wrong tripping schedule which can create problems.

The inventor has therefore understood that there is a need to be able to measure rheology at downhole conditions on a continuous basis, allowing data to be generated continuously, e.g. as long as pumps are on, with minimum interference to operational delivery of drilling fluid. This would also avoid the need to drill part of a wellbore then remove the drill and run a tool to check rheology and/or take a sample to send to a lab for rheology analysis.

The invention more particularly includes a method of determining rheology characteristics of a non-Newtonian fluid at a point down an oil or gas well, the method including the steps of: (a) installing in the drillstring or in a tool of a bottom hole assembly on the drill string a test apparatus comprising a housing having either (i) a bore having different diameter bore sections along its length or (ii) more than one bore, each bore having a different diameter; (b) arranging for a known flow of the fluid to pass through either (i) a plurality of the said bore sections having different diameters, or (ii) a plurality of the said bores having different diameters; (c) sensing the pressure difference between two points in said different diameters; measuring flow rate, pressure and distance for said different diameters; and (e) calculating a viscosity value for each diameter.

In another aspect, the invention includes a method of determining rheology characteristics of a non-Newtonian fluid at a point down an oil or gas well, the method including the steps of:
a) installing in the drillstring or in a tool of a bottom hole assembly on the drillstring a test apparatus comprising a housing having a through bore of substantially constant diameter;
b) arranging for the fluid to pass through the bore at a plurality of different known flow rates;
c) for each different flow rate, sensing the pressure difference between two points along the length of the bore; and
d) calculating from the bore diameter, flow rates, sensed pressure differences and distance between pressure sensing points a viscosity value for each flow rate.

The flow through the test apparatus may be only a portion of the total flow of the fluid in the well. In this way the flow of drilling fluid for normal operational purposes is less affected than if the entire flow passed through the sensing apparatus. The volume flow rate of fluid through the apparatus may be sensed by a flow sensor associated with the apparatus.

The test apparatus may be mounted in the drillstring or in a tool of a bottom hole assembly such that it is substantially prevented from rotating with the drillstring. Although it may be possible to measure viscosity/rheology with the apparatus rotating with the drillstring, the inventor believes that more reliable results may be obtained with the apparatus non-rotating.

In another aspect, the invention includes apparatus for determining rheology characteristics of a non-Newtonian fluid, at a point down an oil or gas well where there is a flow of the non-Newtonian fluid, the apparatus comprising: (a) a housing having a through bore of substantially constant diameter; (b) a pressure sensor at two points along the length of the through bore.

The apparatus may include a flow diverter for causing a known flow rate of the fluid to pass through the bore or bores. It may also include a flow sensor for measuring the volume flow rate of fluid passing through the apparatus.

In another aspect, apparatus for determining rheology characteristics of a non-Newtonian fluid, at a point down an oil or gas well where there is a flow of the non-Newtonian fluid, may comprise: (a) a housing having either (i) a bore having different diameter bore sections along its length or (ii) more than one bore, each bore having a different diameter; (b) a pressure sensor at two points along the length of each different diameter bore or bore section; (c) a pump or flow diverter associated with the housing and capable of causing a known volume flow rate of the fluid to pass through the bore, and also of varying the said known volume flow rate in response to a control signal. A flow sensor may also be included.

The apparatus may also include a mounting assembly for mounting the housing in a drillstring or in a tool of a bottom hole assembly of a drill string such that the housing remains substantially stationary as the drill string rotates.

Also in accordance with the invention is a tool for inclusion in a bottom hole assembly of a drill string, the tool incorporating any of the apparatus described above.

BRIEF DESCRIPTION OF THE DRAWINGS

A more complete understanding of the present invention and benefits thereof may be acquired by referring to the following description taken in conjunction with the accompanying drawings in which:

FIG. 2 is a schematic representation of a second embodiment of a downhole rheometer in accordance with the invention;

FIGS. 3a and 3b are a schematic representations of a third embodiment of a downhole rheometer in accordance with the invention;

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
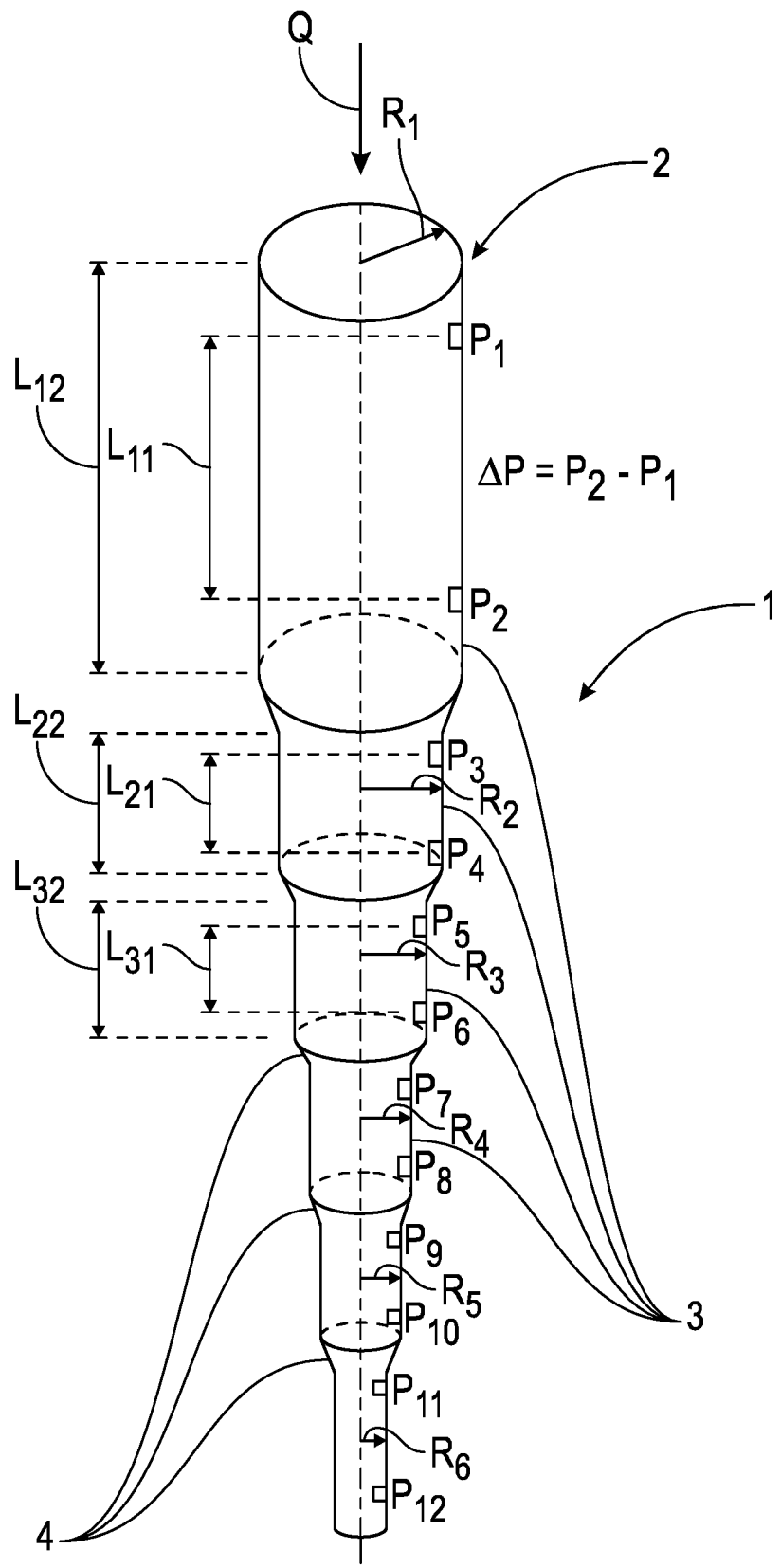
FIG. 1 is a schematic representation of a first embodiment of a downhole rheometer in accordance with the invention.

As shown in FIG. 1, a first embodiment of sensor apparatus is shown. The apparatus 1 is designed to measure parameters related to the rheology of drilling mud comprises a tube 2 having a number of sections 3 each with a different internal diameter $R_1$, $R_2$, etc. Pressure sensors $P_1$ to $P_{12}$ are located along the length of the tube, with two sensors in each tube section 3 which are spaced apart along the length of the tube section.

The sections 3 are of decreasing diameter in the intended direction of flow of fluid (see arrow $Q_1$). Between the sections 3 are transition regions 4 of gradually changing diameter. Each section 3 has a length $L_{12}$, $L_{22}$, $L_{32}$, etc, whilst the distance between the sensor pairs in each section 3 is referenced $L_{11}$, $L_{21}$, $L_{31}$, etc. The exact dimensions of the device have not yet been determined but the overall length is likely to be a few metres in length, e.g. 2 to 10 metres.

The device is designed to be installed in the internal bore of a drillstring, through which drilling mud is circulated, or more likely in a tool forming part of the bottom hole assembly (BHA) of a drillstring. The exact dimensions of the apparatus have not yet been finally established by the inventor(s), but its largest diameter will be less that the internal diameter of the drillstring if installed within the drillstring, so that drilling fluid can bypass the device. If the device is installed in a tool forming part of a BHA, the tool is preferably also be designed such that the majority of the circulating drilling fluid bypasses the sensor apparatus, although in one embodiment the entire flow passes through the device (see FIG. 4).

The diameters R1, R2, etc of each section 3 and the lengths of each section may be determined so as to result in a known flow or a known proportion of the flow of drilling fluid flowing through the device.

Alternatively, apparatus such as a flow diverter is provided to regulate the volume flow entering the device may be provided at the upstream end, for example in a way similar to a demand valve on a scuba tank. In this way the valve allows only what is needed from the main flow to be taken to do the test; furthermore it will only work once the main flow is above a certain threshold so that it can supply enough flow to do the test.

Alternatively or in addition, a volume flow rate sensor may be provided on the device.

The pressure drop, Δp, between each pair of sensors in each section, together with the volume flow rate, can be used according to well-known formulas to provide viscosity values at a certain shear stress. The formulas may be found, for example, in the paper by Vajargah cited above.

For a given flow, the diameters and lengths of each section will be determined according to well-known formulas to give equivalent viscosity measurements to the rotating drum type viscometers/rheometers, e.g. the Fann 75 or Grace 7500 mentioned above. Conventionally, the Fann and Grace instruments give a number of readings for different r.p.m. values.

The largest diameter section of the tube could be dimensioned to give a reading equivalent to a 3 r.p.m. reading from, e.g., a Fann 75, the next section 3 a reading equivalent to a 6 r.p.m. reading from a Fann 75, the third section 3 a reading equivalent to a 100 r.p.m. reading from a Fann 75, etc. The other standard r.p.m.s are 200, 300 and 600 and further smaller diameters of the device may be provided to model the higher shear values created by these r.p.m.s.

However, it is not necessary to dimension the different sections in this way. At a known flow, i.e. shear rate, it is possible to calculate a shear stress based on the delta pressure loss, i.e. comparable to a rotating rheometer where the rotational speed is known. From this, the shear stress can be calculated.

The sensor apparatus is mounted within a tool forming part of the BHA of a drillstring and transported with the advancing drillstring down a well or partially drilled well, or during a drilling operation, to the depth of interest. This will be described in more detail below in connection with all the embodiments and with respect to FIG. 5.

A second embodiment of sensor apparatus 21 is shown in FIG. 2. This embodiment is simpler than the first, comprising simply a tube 22 of constant diameter with an upstream and downstream pressure sensor $P_1$ and $P_2$. This embodiment, like the first, would be mounted in a BHA. However, this embodiment would require the flow rate of drilling fluid through the device to be varied in order to give readings for different shear stress equivalent to the r.p.m. settings of, e.g., a Fann 75 device. This could be arranged by having a separate pumping apparatus associated with the tool, by having an adjustable flow diverter device, or by varying the drilling fluid flow rate through the drillstring from the wellhead pump. In the latter case, a disadvantage would be that continuous sensing of fluid properties would not be possible, since normal operations would have to be suspended for a period in order to vary the drilling fluid flow rate.

A third embodiment of sensor 31 is shown in FIGS. 3a and 3b. This embodiment comprises a cylindrical housing 32. Within the housing 32 are separate bores 33a-33f, each having a different radius $R_1$, $R_2$, etc. Within each bore 33 is a pair of pressure sensors $P_1$, $P_2$ arranged along the bore. In use, flow through the bores would of course be in parallel. If a flow diverter is used to regulate the flow through the device, it may need to include some arrangement to regulate separately the flow through each bore. In most respects, however, the operation of the third embodiment is similar to the first embodiment.

Figure 4:
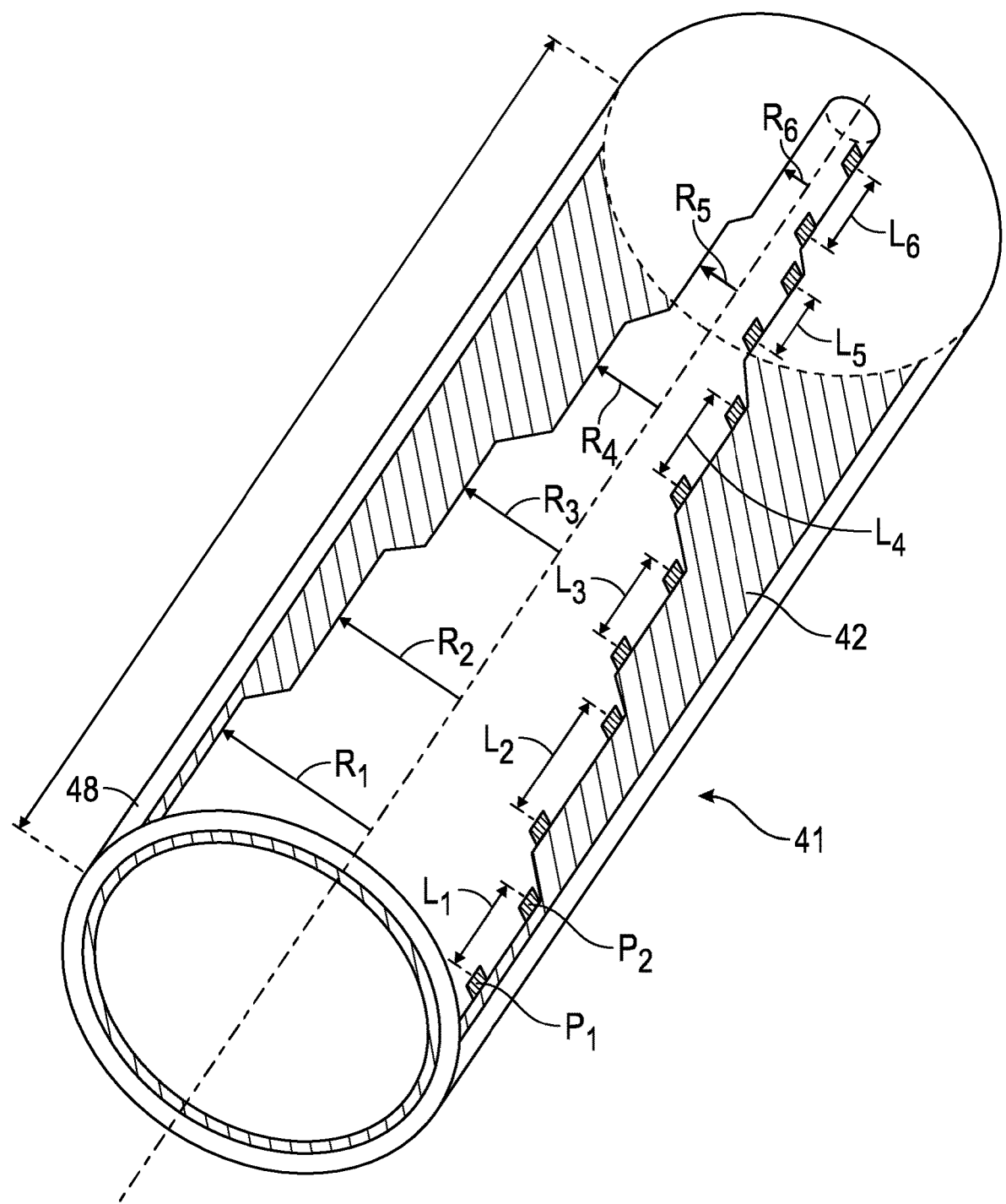
FIG. 4 is a schematic representation of a fourth embodiment of a downhole rheometer in accordance with the invention.

A fourth embodiment of sensor 41 is shown in FIG. 4, installed in a section of drillpipe or BHA tool 47. The sensor apparatus is very similar in principle to the first embodiment, with the exception that it occupies substantially the entire diameter of the drillstring or, more probably, a tool of a bottom hole assembly. It comprises a housing 42 with a length in the region of 6 metres having a constant external diameter of, e.g., 6⅝ inch (166 mm), but having a stepped internal bore going down to a minimum of 2.5 inches. In this embodiment, all the drilling fluid flow passes through the sensor. For this reason even the smallest diameter section has a relatively large bore so as not to restrict unduly the flow of drilling fluid. Because of the different diameter sections providing different shear, there is no need artificially to alter the drilling fluid flow rate. As in the first embodiment, pressure sensors are located in each section to detect a delta P for each diameter.

Figure 5:
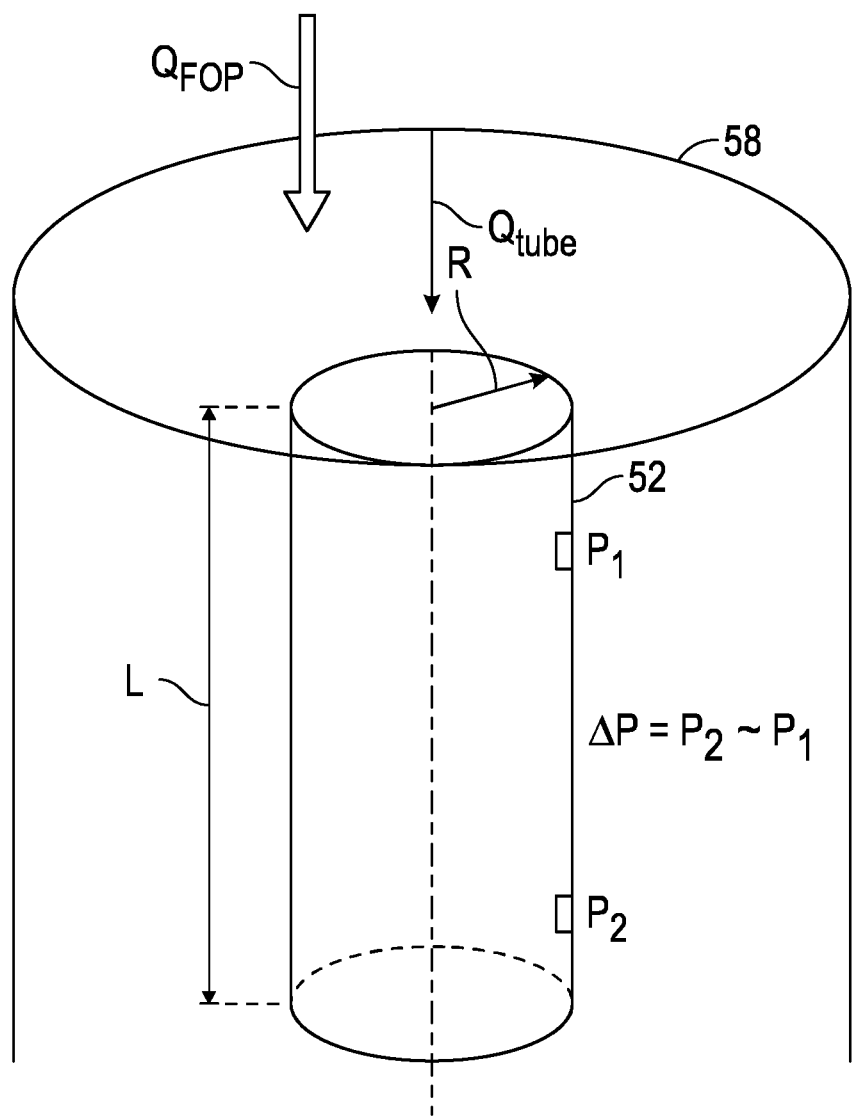
FIG. 5 is a schematic representation of the mounting of a tool in accordance with the invention in the inner bore of a bottom hole assembly tool.

FIG. 5 shows a sensor tube 52 installed in a drillstring/drillpipe or a tool 58 forming part of a BHA. For simplicity, the second embodiment of sensor apparatus is shown installed within the drillpipe/tool 58 but it could be replaced by the first embodiment (but not the third embodiment).

The sensor tube 52 is shown installed centrally within the bore of the drillpipe/tool 58 such that the majority of the interior cross section of the drillpipe/tool is free for drilling fluid to flow past the sensor (overall drilling fluid flow referenced $Q_{FDP}$). A portion of the flow $Q_{tube}$ passes through the sensor.

The inventors believe that better results will be obtained if the sensor is prevented from rotating with the remainder of the drillpipe/BHA 58. Tools are well-known which are designed to be part of a BHA but to be prevented from rotating with the drill string—for example non-rotating stabilizers. It is proposed that a similar arrangement is employed for preventing rotation of the sensor apparatus with respect to the tool or drillstring, or preventing rotation of the tool in which the sensor apparatus is installed. However, it may be possible to remove the rotational effects by the use of mathematics, so the prevention of rotation may not be necessary.

It will be appreciated that the number of different diameters of bore provided in any of the embodiments is not fixed. In general the more different diameters, the more data will be collected and the more useful the result will be. Obviously, using fewer diameters will make for simpler and less expensive apparatus which also, being smaller, may interfere less with the normal running of the well.

In all four embodiments, the pressure sensors will measure the pressure of the flow at a certain point and the difference in pressure between the start and end of the flow through a certain diameter of bore can be established. The pressure delta, together with the flow rate, diameter of the bore, the temperature and pressure (normally available from other instruments) and mud weight (ppg) can be used to establish a shear stress (Pa) and shear rate ($sec^{-1}$) according to the formula Shear Rate $T_{wall}=R/2*dp/dl$, $R$=radius, $dp/dl$=delta pressure loss Shear Stress $\gamma_{wall}=(3N+¼N)*8v/D$, The shear stress and shear rates may be used to give the data output needed for updating the simulation models in real time.

In closing, it should be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:

"Determination of drilling fluid rheology under downhole conditions by using real-time distributed pressure data", Vajargah et al., *Journal of natural Gas Science and Engineering*.

The invention claimed is:

1. A method of determining rheology characteristics of a non-Newtonian drilling fluid at a point down an oil or gas well in real time while drilling, the method including the steps of:
    a) installing in a drillstring a test apparatus comprising a housing having either (i) a bore having different diameter bore sections along its length or (ii) more than one bore, each bore having a different diameter;
    b) arranging for a known flow of the drilling fluid to pass through the or each bore while drilling;
    c) for each different diameter bore or bore section, while drilling, sensing the pressure difference between two points along the bore or bore section; and
    d) calculating from the bore or bore section diameter, flow rates, sensed pressure differences and distance between pressure sensing points a viscosity value for each diameter bore or bore section.

2. The method of claim 1 wherein the flow through the test apparatus is only a portion of the total flow of the fluid in the well.

3. The method of claim 1, further including providing a volume flow sensor for sensing the volume flow rate of fluid passing through the test apparatus.

4. The method of claim 1 wherein the test apparatus is mounted in the drillstring such that the test apparatus is substantially prevented from rotating with the drillstring.

5. A method of determining rheology characteristics of a non-Newtonian drilling fluid at a point down an oil or gas well in real time while drilling, the method including the steps of:
    a) installing in a bottom hole assembly on a drillstring a test apparatus comprising a housing having either (i) a bore having different diameter bore sections along its length or (ii) more than one bore, each bore having a different diameter;
    b) arranging for a known flow of the drilling fluid to pass through the or each bore while drilling;
    c) for each different diameter bore or bore section, while drilling, sensing the pressure difference between two points along the bore or bore section; and
    d) calculating from the bore or bore section diameter, flow rates, sensed pressure differences and distance between pressure sensing points a viscosity value for each diameter bore or bore section.

6. The method of claim 5 wherein the flow through the test apparatus is only a portion of the total flow of the fluid in the well.

7. The method of claim 5, further including providing a volume flow sensor for sensing the volume flow rate of fluid passing through the test apparatus.

8. The method of claim 5 wherein the test apparatus is mounted in the bottom hole assembly such that the test apparatus is substantially prevented from rotating with the drillstring.

* * * * *